Oct. 30, 1951 J. T. McGRAW 2,573,587
VEHICLE PARKING SYSTEM
Filed July 17, 1947 5 Sheets-Sheet 2
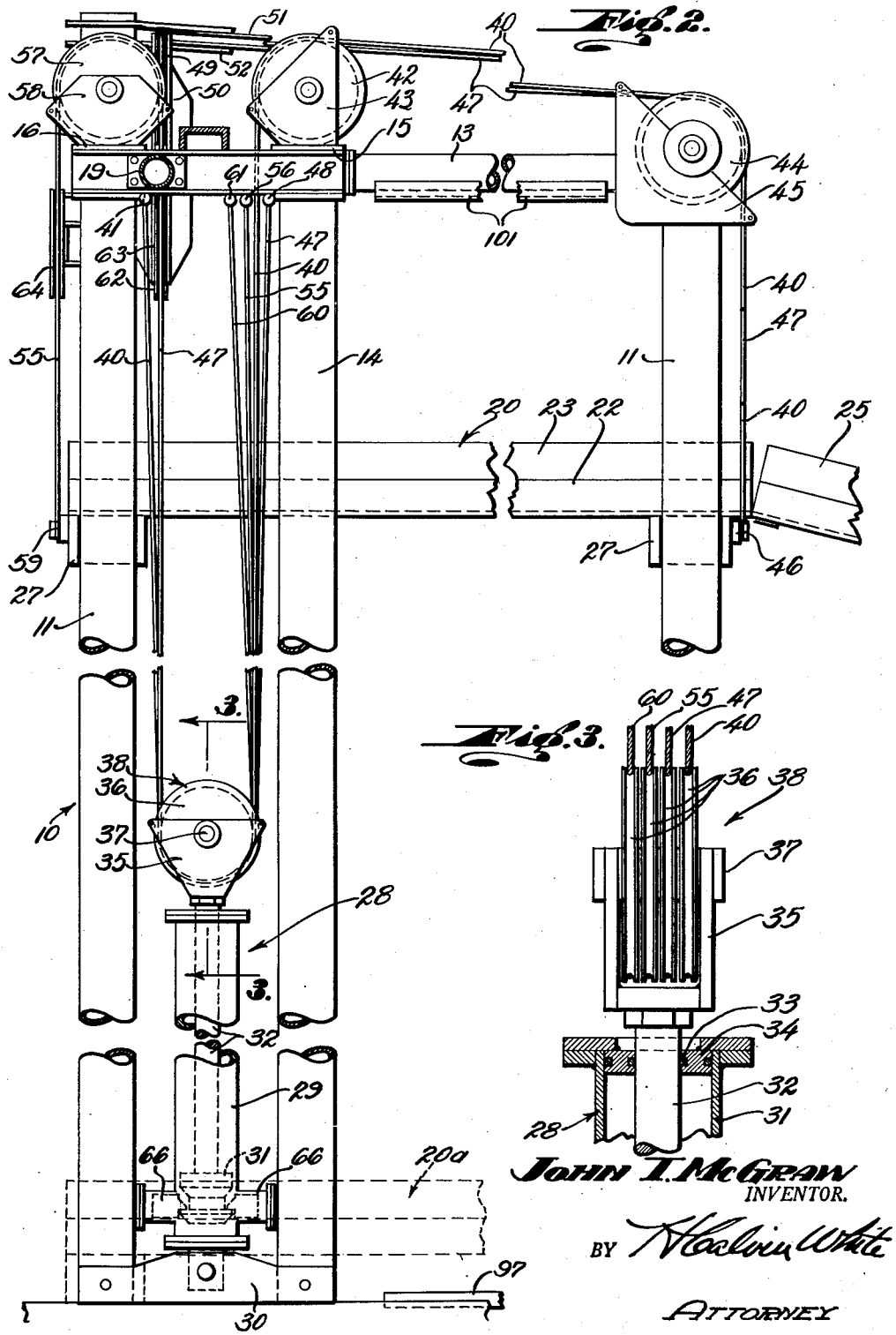

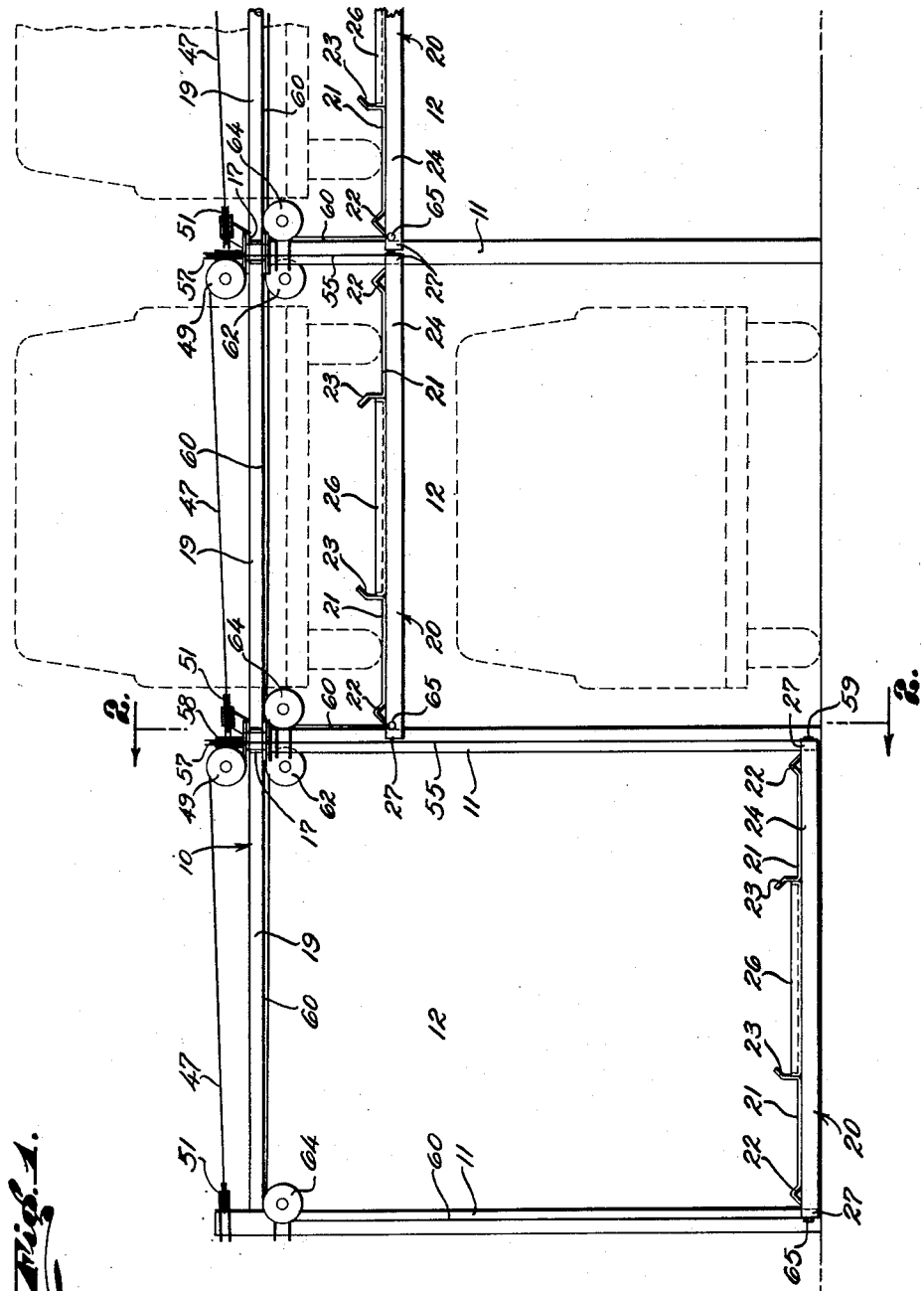

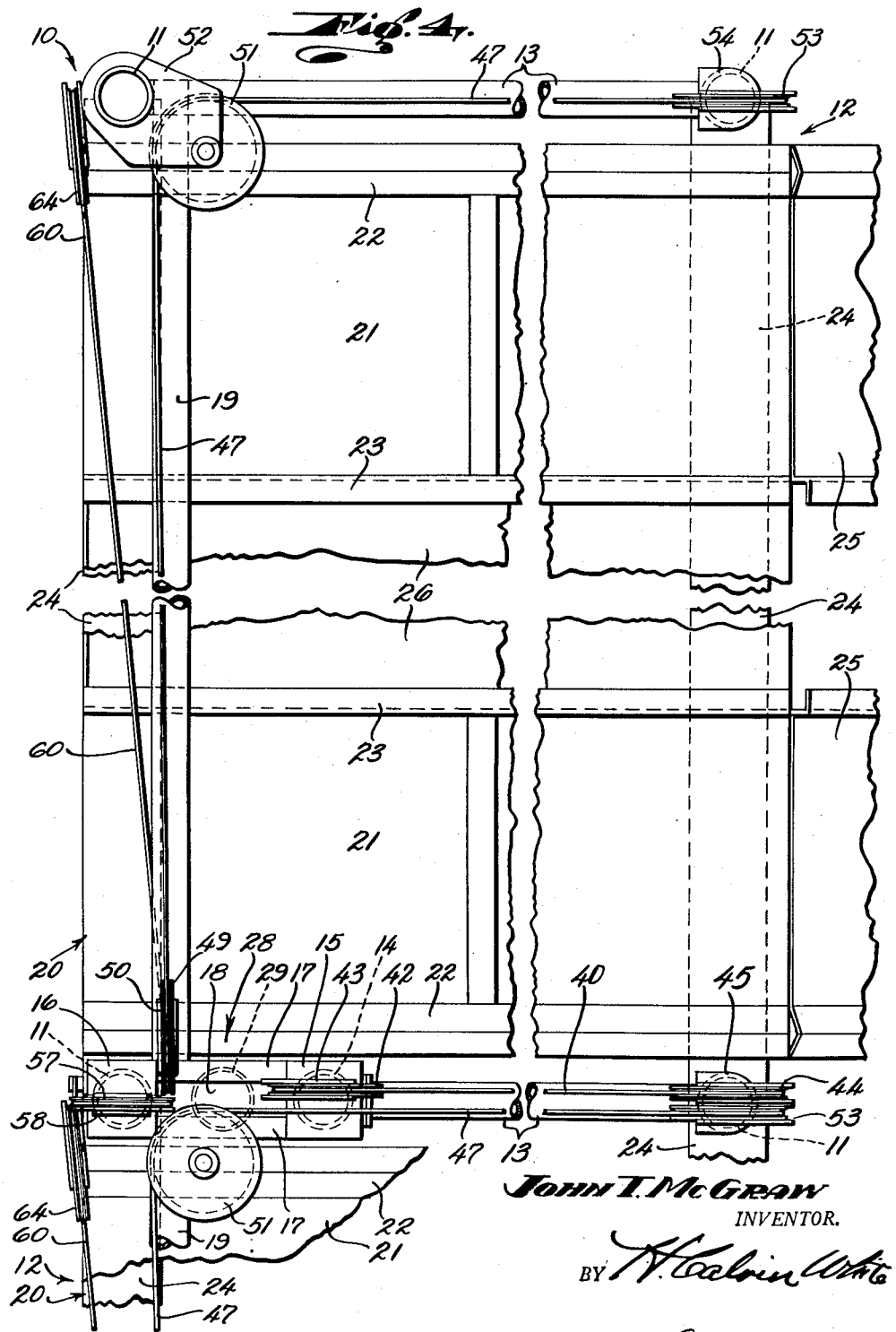

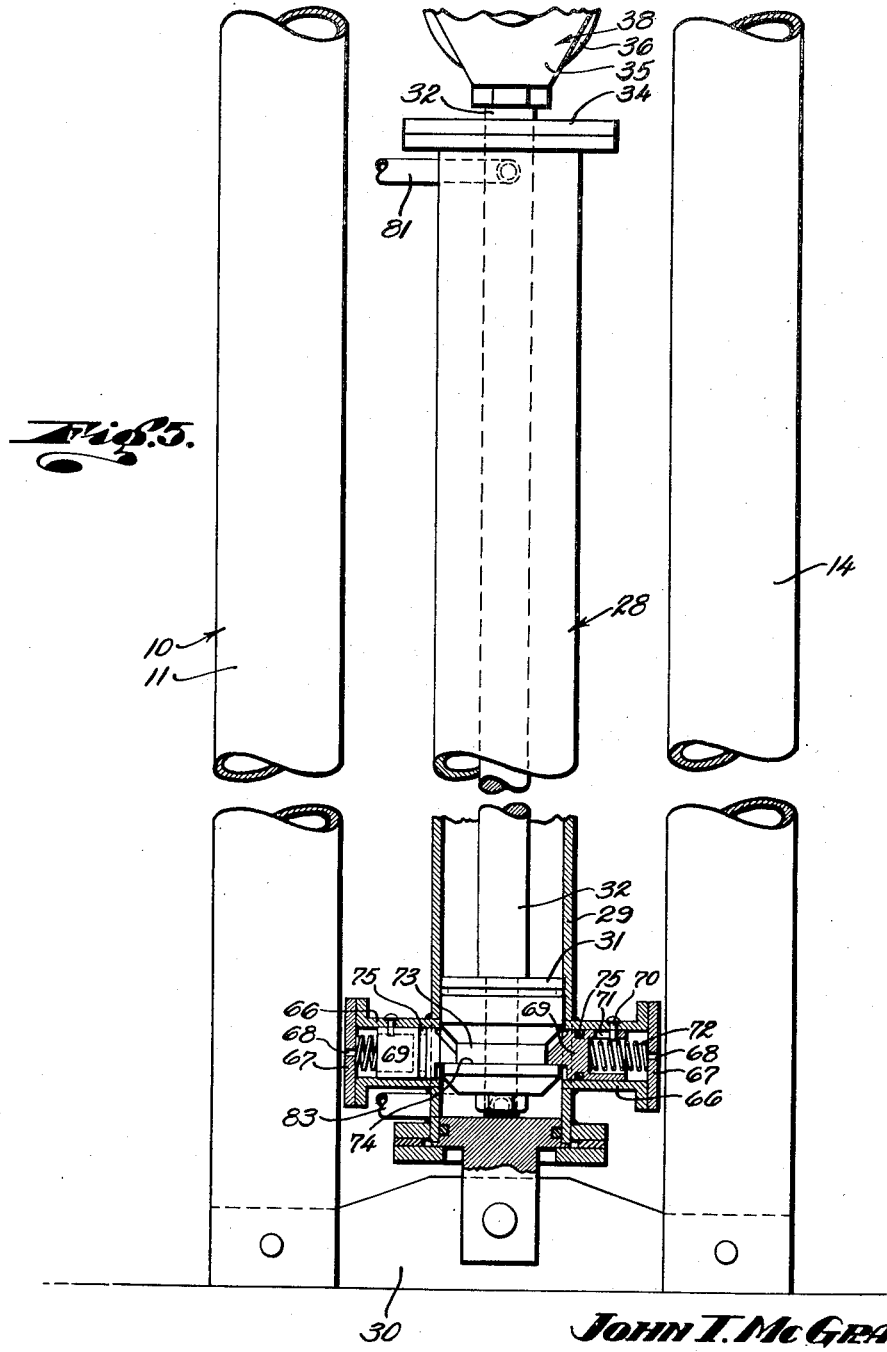

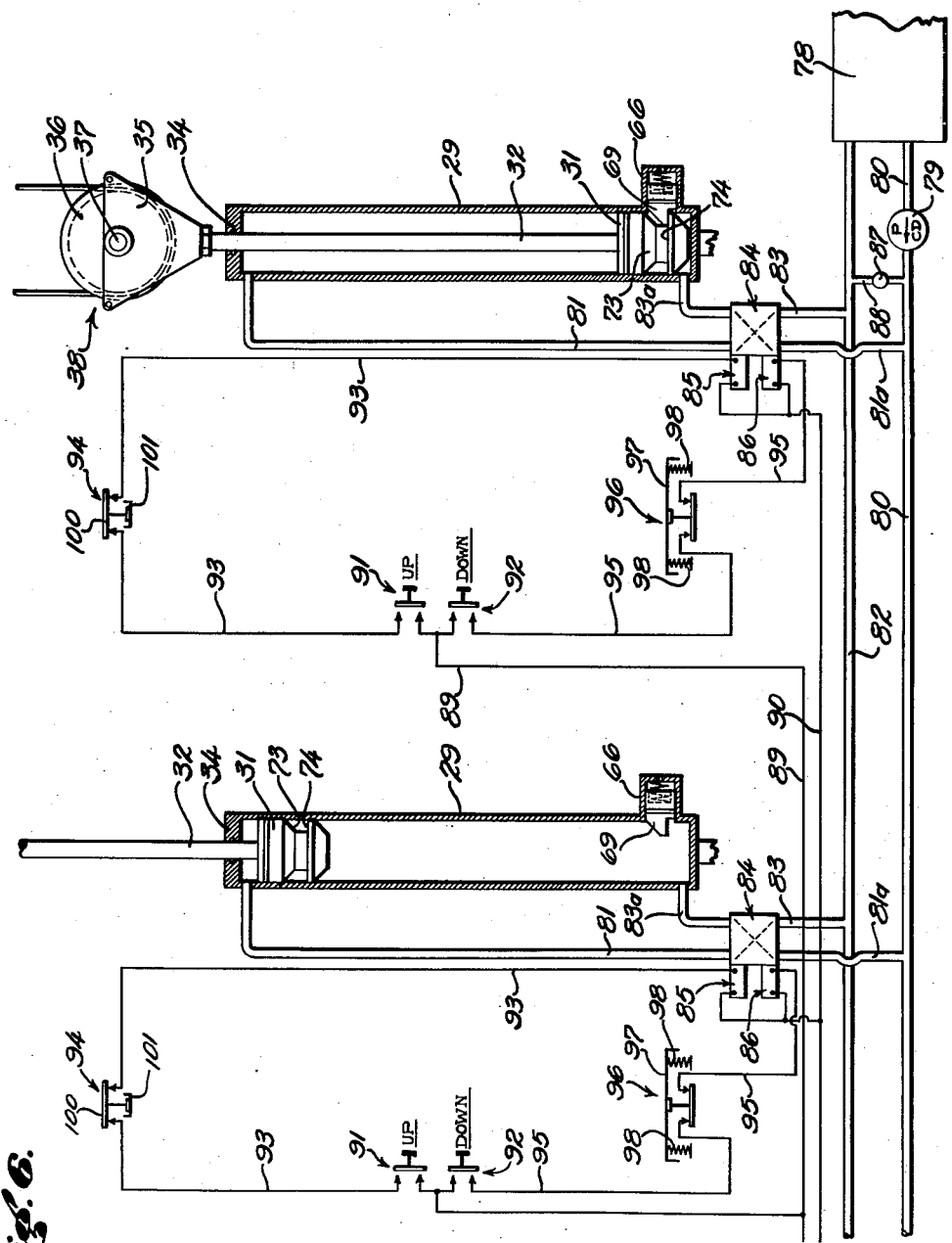

Patented Oct. 30, 1951

2,573,587

UNITED STATES PATENT OFFICE 2,573,587

VEHICLE PARKING SYSTEM

John T. McGraw, Los Angeles, Calif., assignor, by mesne assignments, to Edward D. Fryer, Beverly Hills, Calif.

Application July 17, 1947, Serial No. 761,586

6 Claims. (Cl. 214—16.1)

1

This invention has to do with improvements in automobile parking systems and equipment, and has for its general object to increase the car capacity of a given parking lot area by providing for the accommodation of cars at elevated as well as ground levels.

Generally speaking, the invention contemplates installation in the lot area of equipment affording a series of parking stalls, preferably alined in side by side relation and in however many rows the lot may accommodate. Each stall is adapted to receive an automobile at ground level, or substantially ground level, and contains an elevator whereby a second car may be accommodated in raised position within the stall area. Thus, after a first automobile is received and raised by the elevator, a second may be driven into the stall beneath the raised car. The facility with which the cars may be driven into and out of the stalls is aided by a stall construction permitting passage of the cars through them and entry from either end.

Structurally the invention contemplates a skeleton frame assembly comprising vertical columns or posts positioned between or defining the stalls, and means for supporting the elevators from the columns. While in certain aspects of the invention, any suitable type of power unit and connection with the elevator may be used for operating the latter, I have devised a particular and preferred power source characterized by its special adaptability to the present purpose, and the simplicity with which its movements may be transmitted to the elevator.

Preferably each elevator is powered by a fluid pressure actuated piston or ram, positioned to operate vertically between adjacent stalls, and having flexible connections, such as cables, with four corner portions of the elevator so that reciprocation of the piston causes vertical movement of the elevator between its supporting columns.

A further object is to provide improved controls for releasably locking the elevators against accidental lowering from raised positions. Specifically the invention contemplates a locking or latching device coacting with the piston and releasable by fluid pressure to permit lowering of the elevator.

Another feature of the invention is the employment of a system of cables, or cable runs, whereby from a single reciprocating power ram, lifting forces are transmitted to all four corners of the elevator.

The invention has various additional features

2 and objects, all of which, as well as those referred to in the foregoing, will be fully understood from the following detailed description of a typical embodiment of the invention as illustrated by the accompanying drawings, in which:

Fig. 1 is a view showing the stall series in elevation, and what may be regarded as the rear end of the stalls;

Fig. 2 is an enlarged fragmentary and broken section on line 2—2 of Fig. 1;

Fig. 3 is a fragmentary enlarged section on line 3—3 of Fig. 2;

Fig. 4 is an enlarged fragmentary broken plan view of Fig. 1;

Fig. 5 is an enlarged view showing one of the elevator operating rams and associated locking devices, partly in section; and Fig. 6 is a view illustrating diagrammatically the controls for the system.

Referring first to Fig. 1, the equipment comprises a skeleton frame structure 10 which includes vertical columns 11 positioned at the corners of the stalls 12 and alined longitudinally of the stall series. The top portions of the columns are interconnected by suitable members, such as pipes 13 extending transversely of the stall series, i. e. between the columns at the sides of the stall. Columns 11 at what may be regarded as the front of the stall, that is at the right end as viewed in Fig. 2, are unconnected by transverse members, thus avoiding any obstruction in the path of any portion of an automobile that may be elevated between the front columns. A third column 14 is interposed between the columns at one side of each stall and toward the rear thereof, the top of each column 14 carrying a casting or cap 15 connected to a similar casting 16 on the adjacent rear column 11, by a pair of channels 17 having between them a cable passing space 18, see Fig. 4. The inner channels for each stall are interconnected by a transverse beam or pipe 19.

Each stall contains an elevator, generally indicated at 20 comprising a sheet metal floor 21 having raised wheel guide ribs or projections 22 and 23 and supported on cross members 24. The forward end of the elevator may carry short inclined ramp 25 upon which an automobile entering the stall travels onto the elevator which, in its bottom position illustrated at the left in Fig. 1, is a short distance above ground level. The central portion 21a of the elevator floor between guides 23 may have up-turned end flanges 26 so that this central area of the floor may serve as a pan to collect and prevent grease from falling onto a car below. Each corner of the elevator carries or is supported on a semi-circular guide 27 which engages and travels vertically along the columns 11. The guides 27 preferably have sufficient clearance from the pipe columns that in the event the elevator may tend to incline or tip in any direction, as through failure of one of the later described suspending cables, a lower edge of the guide will tend to bind or bite against the column surface and thus vertically support the elevator.

Referring now to Figs. 2 and 3, each elevator is actuated by its individual power unit, generally indicated at 28 positioned directly between the columns 11 and 14. Each power unit comprises a fluid (preferably hydraulic) pressure actuated ram composed of a vertical cylinder 29 supported on plate 30 interconnecting the bases of the columns, and containing a movable power element or piston assembly comprising piston 31 and rod 32, the latter extending upwardly through suitable packing 33 in head 34 of the cylinder. Rod 32 carries a sheave holder or bracket 35 containing the sheave wheels 36 turning on an axle 37.

Provision is made for transmitting by way of a system of cable runs, vertical bodily reciprocation of the sleeve wheel assembly 38 to raise the elevator 20, and also if desired, to control the rate of the elevator descent. Distribution of the cable runs involves a system of pulleys or sheaves mounted on the several columns as best illustrated in Figs. 2 and 4. One cable 40 anchored at 41, see Fig. 2, extends about one of the sheaves 36 upwardly about sheave 42 mounted by bracket 43 on column 14, the cable thence running over sheave 44 carried by bracket 45 on the forward column 11, downwardly to a connection at 46 with one of the front corners of the elevator. A second cable 47 extends from its anchorage at 48 about a second sheave 36 and upwardly over a sheave 49 carried by bracket 50. From sheave 49 the cable 47 extends above frame member 19 to a horizontally positioned sheave 51 carried by bracket 52, see Fig. 4, the cable thence running forwardly above frame member 13 to sheave 53 carried by bracket 54 and from which the cable passes downwardly to a connection like 46 with the opposite forward corner of the elevator.

A third cable 55 extends from its anchor point 56 about a third sheave 36 and upwardly about a sheave 57 carried by bracket 58 on the rear column 11, the cable thence passing down to a connection at 59 with one of the rear corners of the elevator. A fourth cable 60 extends from its anchorage 61 about the fourth sheave 36 and upwardly over sheave 62 carried by bracket 63, the cable 60 thence angling laterally to pass over sheave 64 carried on a rear frame column 11 and thence downwardly to a connection at 65 with the fourth corner of the elevator.

From the foregoing it will be appreciated that the elevator load will exert through the described cable system an upward pull on the sheave assembly 38 tending to elevate the piston 31 until the elevator reaches its ground or bottom position indicated by the dotted lines 20a in Fig. 2. Pressure fluid introduced to the cylinder 29 above the piston, forces the piston and sheave assembly downward, with resultant transmission of pull through the cable system to raise the elevator to the top position appearing in Figs. 1 and 2. Provision is made for releasably latching or locking the elevator in raised position, preferably by application of the lock directly to the actuating piston 31. Referring to Fig. 5, the piston cylinder 29 is shown to carry opposite the piston 31 in its down position, a pair of diametrically opposed short cylinders 66 having covers 67 containing restricted orifices 68. Each of the cylinders 66 contains a locking element or dog 69 held against rotation by pin 70 projecting into slot 71 and thrust by coil spring 72 in the piston recess 73 and into engagement with shoulder 74 to lock the piston against upward displacement. Each of the locking dogs 69 may carry a seal ring 75 preventing fluid leakage from the piston cylinder. Thus with the elevator in raised position, dogs 69 are engaged against the piston to prevent accidental lowering of the elevator. As will appear, the control system provides for the introduction of pressure fluid to the cylinder 29 below the piston to force the dog 69 outwardly against the resistance of spring 72 to release the piston for upward movement.

Fig. 6 is illustrative of a typical fluid supply and control system for actuating and governing the operation of the power units and their associated locking devices. A suitable pressure fluid, preferably liquid, is delivered from a reservoir 78 by pump 79 through line 80 which may deliver through branch lines 81 to the upper interior of a series of the power unit chambers 29. Return fluid line 82 is connected with the bottoms of the cylinders 29 by way of pipes 83. Fluid flow to and from the cylinders is controlled by the conventionally illustrated solenoid operated four-way valve 84 connected into the lines 81 and 83, the valve being of a conventional type adapted to be actuated by solenoids 85 and 86 in reverse directions from a neutral position, to reverse the flow through lines 81 and 83, as will presently appear. The pressure fluid may be caused to by-pass the entire system by relief valve 87 in line 88 at the discharge side of the pump 79.

Current is supplied to the electrical controls through lines 89 and 90, the former connecting with one pair of poles of the "up" and "down" switches 91 and 92. The second pole of switch 91 is connected through line 93 and the normally closed switch 94 with the valve actuating solenoid 85. The second pole of switch 92 is connected through conductor 95 and normally closed switch 96 with the valve solenoid 86. Line 90 is connected directly to the solenoids 85 and 86, as illustrated.

Switch 96 is positioned to be responsive to the presence or weight of an automobile at ground level in the stall, to prevent inadvertent lowering of the elevator onto the car. Typically, the switch 96 may be positioned beneath a vertically displaceable control member or tread plate 97, see Fig. 2, normally elevated by springs 98 to close the switch. A car entering the stall at ground level will travel upon and depress the tread plate 97 to hold the switch open. Switch 94 is mounted on the cross member 13 for the purpose of arresting upward travel of the elevator in the event any portion of an automobile carried thereby might tend, in the absence of the switch, to become raised into engagement with member 13. Switch 94 may comprise essentially a contact element 100 attached to a vertically displaceable bumper 101, see Fig. 2, which when engaged by any part of a car being raised by the elevator, opens the switch to deenergize the control valve solenoid.

In considering the operation of the system, assume the elevator 20 to be down and piston 31 to have the up-position illustrated at the left in Fig. 6. Assume also that the associated control valve 84 is in a neutral position closing lines 80 and 82 from communication with the cylinder 29, by permitting the by-pass of fluid from line 80 to line 82. By closing switch 91, valve 84 is thrown to a position at which pressure fluid is communicated through line 81 to the cylinder above the piston, and communication is open between the cylinder and line 82 through branch 83. While switch 91 is held closed, the piston is forced down to the limit of its stroke illustrated at the right of Fig. 6, with resultant raising of the elevator. As the piston recess 73 is brought opposite the locking dogs 69, the latter are thrust against shoulder 74 to lock the piston against upward displacement. With the elevator and any car carried by it raised, a second automobile then may be accommodated in the stall at ground level.

At such time as the stall contains a car beneath the elevator, depression of the tread plate 97 opens the circuit in line 95 to prevent lowering of the elevator. After removal of the lower automobile, the elevator may be lowered by closing the switch 92, which results in the control valve 84 being thrown to a position at which the high pressure fluid is delivered to the bottom of the cylinder 29 through section 81a of the branch 81 and section 83a of the branch 83, the top of the cylinder then being placed in restricted communication through the valve with the return line 82, by way of lines 81 and 83 respectively at the cylinder and reservoir sides of the valve. Communication of the high pressure fluid to the cylinder 29 below the piston, displaces the locking dogs 69 to release the piston, which then is driven upwardly at a rate determined by the rate at which the valve permits displacement of fluid from the upper interior of the cylinder through line 81 back into the reservoir line.

I claim:

1. An automobile parking system comprising a skeleton framework defining a pair of adjacent stalls each adapted to contain automobiles in low and raised positions, an elevator in each stall for receiving and elevating an automobile to raised position, means for raising the elevators to levels permitting entry of automobiles beneath them, and means responsive to movement of an automobile into one of said stalls beneath the corresponding elevator to prevent lowering of that elevator into engagement with the automobile.

2. An automobile parking system comprising a skeleton framework defining a pair of adjacent stalls each adapted to contain automobiles in low and raised positions, an elevator in each stall for receiving and elevating an automobile to raised position, means for raising the elevators to levels permitting entry of automobiles beneath them, a control member in the path of an automobile entering one of said stalls and deflectible by the automobile as it enters, and means actuated by deflection of said control member for preventing lowering of the corresponding elevator while the automobile is positioned therebeneath.

3. An automobile parking system comprising a skeleton framework defining a pair of adjacent stalls each adapted to contain automobiles in low and raised positions, an elevator in each stall for receiving and elevating an automobile to raised position, means for raising the elevators to levels permitting entry of automobiles beneath them, a movable treadle member mounted for downward deflection by the wheel of an automobile entering one of said stalls, and means actuated by such downward deflection of said treadle member to prevent lowering of the corresponding elevator while the automobile is positioned therebeneath.

4. An automobile parking system comprising a skeleton framework defining a pair of adjacent stalls each adapted to contain automobiles in low and raised positions, an elevator in each stall for receiving and elevating an automobile to raised position, a power unit for raising and lowering each elevator between a lowered position and a raised position permitting entry of an automobile therebeneath, and means operable in response to movement of an automobile into position beneath one of the elevators to deenergize said power unit against lowering of that elevator into engagement with the automobile.

5. An automobile parking system comprising a skeleton framework defining a pair of adjacent stalls each adapted to contain automobiles in low and raised positions, an elevator in each stall for receiving and elevating an automobile to raised position, a power unit for raising and lowering each elevator between a lowered position and a raised position permitting entry of an automobile therebeneath, a movable treadle member mounted for downward deflection by the wheel of an automobile entering one of said stalls, and means actuated by such downward deflection of said treadle member to deenergize said power unit against lowering of the elevator into engagement with said automobile.

6. An automobile parking system comprising a skeleton framework defining a stall adapted to contain an automobile in low and raised positions, an elevator in the stall for receiving and elevating an automobile, a fluid pressure actuated power unit for raising and lowering said elevator between a lowered position and a raised position permitting entry of an automobile therebeneath, valve means controlling the delivery and discharge of pressure fluid to and from said power unit, electrical control means for actuating said valve means to a condition for effecting lowering of the elevator, and a switch operable in response to movement of an automobile into said stall beneath the raised elevator to deenergize said electrical control means against actuation of said valve means to said condition for lowering the elevator.

JOHN T. McGRAW.

REFERENCES CITED

The following references are of record in the file of this patent:

UNITED STATES PATENTS

| Number | Name | Date |
|---|---|---|
| 488,838 | Rowland | Dec. 27, 1892 |
| 1,704,342 | Redpath et al. | Mar. 5, 1929 |
| 1,747,765 | Fitch | Feb. 18, 1930 |
| 1,843,793 | Wagner | Feb. 2, 1932 |
| 2,139,597 | Martin | Dec. 6, 1938 |
| 2,150,628 | Mizer | Mar. 14, 1939 |
| 2,238,573 | Steedman | Apr. 15, 1941 |
| 2,242,891 | Light | May 20, 1941 |
| 2,242,892 | Light | May 20, 1941 |
| 2,408,762 | Dunlop et al. | Oct. 8, 1946 |
| 2,493,875 | Hunter | Jan. 10, 1950 |